3,756,932
ELECTROLYTIC CYANIDE DESTRUCTION

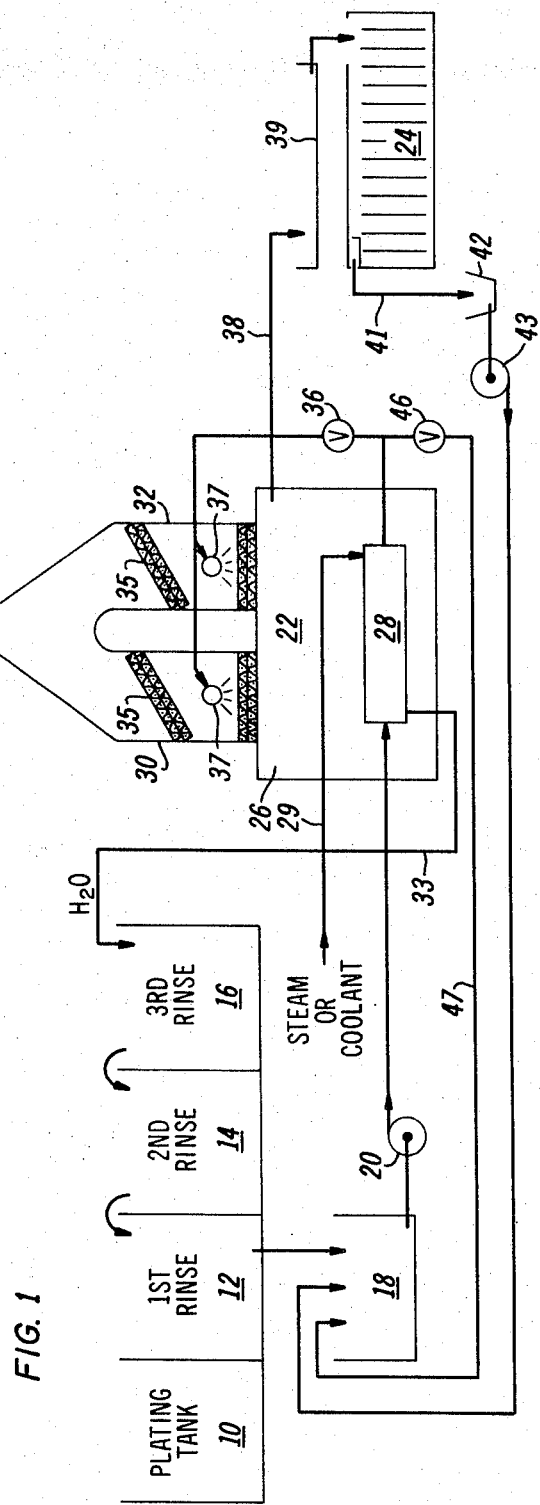
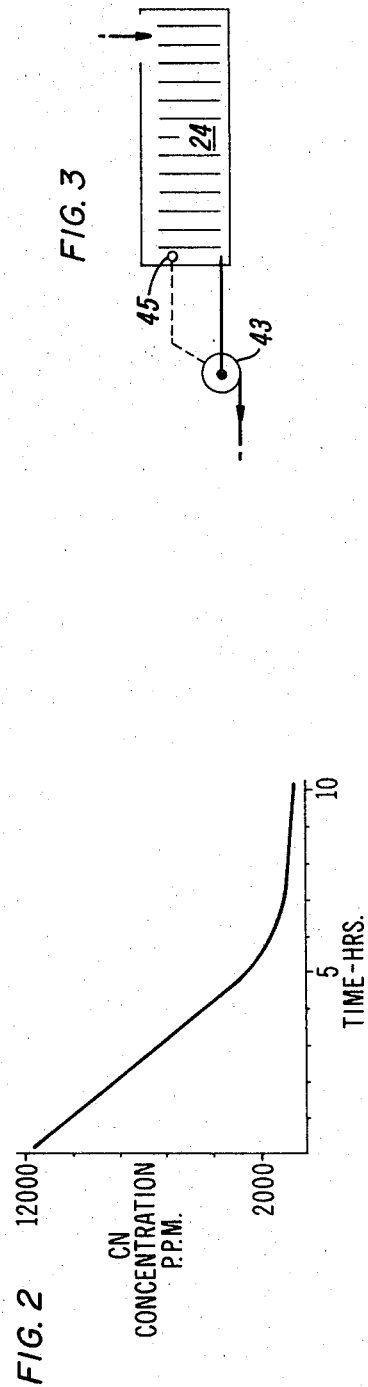

James F. Zievers, La Grange, and Charles J. Novotny, Hickory Hills, Ill., assignors to Industrial Filter & Pump Mfg. Co., Cicero, Ill.
Filed Apr. 8, 1971, Ser. No. 132,396
Int. Cl. C02c 5/12, 1/82
U.S. Cl. 204—149     3 Claims

ABSTRACT OF THE DISCLOSURE

Cyanide bearing waste solutions are passed through an evaporator to increase the concentration of cyanide therein before being supplied to an electrolytic decomposition tank from which the solution is recirculated through the evaporator to maintain the concentration of cyanide in the electrolytic decomposition tank at a level permitting efficient operation thereof.

---

The present invention generally relates to the art of waste treatment, and it relates more particularly to a new and improved method and system for destroying cyanide contained in waste solutions.

Cyanide compounds are commonly used in the plating industry and both simple and complex cyanide salts as well as the free cyanide ion are present in the waste liquids from such plants. With the recent recognition of the need to prevent the discharge of toxic wastes into the environment, a re-evaluation of the systems available to the plating industry for preventing the discharge of cyanide bearing wastes has become of great importance.

Perhaps the most common practice for removing cyanide from waste solutions has been the use of an alkali-chlorination treatment. Another known system employs an electric current to break down the cyanide compounds and the cyanide ion to release free nitrogen and carbon dioxide to the atmosphere. This latter system has not heretofore been economical, however, to reduce the concentration of cyanide to an innocuous level. Rather, electrolysis, as this system is called, is successfully used only to reduce the cyanide concentration and the solution must then be subjected to an alkali-chlorination or other treatment.

An object of the present invention is, therefore, to provide a new and improved method and system for treating cyanide bearing waste solutions to reduce the level of cyanides therein.

Another object of this invention is to provide a substantially continuous method and system for removing cyanide from cyanide bearing solutions.

A further object of this invention is to provide an economically feasible system for removing cyanide from the discharges from metal plating systems.

Briefly, the above and further objects may be realized in accordance with the teachings of the present invention by concentrating the waste solution to increase the concentration of cyanide to about 2000 p.p.m. or more, than electrolyzing the solution by passing a direct electric current therethrough to break down the cyanide compounds and cyanide ions and reconcentrating the solution to maintain the concentration of cyanides in the solution through which current is passed at a value of about 2000 p.p.m. or more.

Further objects and advantages and a better understanding of the present invention may be had from the following detailed description taken in connection with the accompanying drawing, wherein:

FIG. 1 is a schematic flow diagram of a cyanide destruction system embodying the present invention; and FIG. 2 is a graph showing the time required to break down cyanide in a typical electrolytic cyanide destruction system.

It will be understood that the present invention finds application wherever it is desired to remove cyanide from a cyanide bearing solution. Since, however, primary use of the invention at the present time is in the treatment of discharges from the metal plating industry, it is described hereinafter in conjunction with a metal plating system.

Referring now to the drawing, a portion of a typical metal treating line comprises a tank 10 containing a metal plating solution including cyanide compounds and free cyanide ions. The articles being plated are carried from the tank 10 to a first rinse tank 12, then to a second rinse tank 14 and then to a third rinse tank 16. Fresh water is supplied to the rinse tank 16 and flows over a weir into the tank 14 and then over another weir into the tank 12. The tanks 12, 14, and 16 are running tanks and the used rinse water exits the tank 12 and flows into a retention tank 18.

The tank 18 thus contains a substantially diluted plating solution which comprises free cyanide ions and cyanide compounds at a normal concentration of between 50 and 300 parts per million. In the plating industry, the accepted practice has been to reduce this concentration to less than one part per million by adding chemicals thereto in accordance with the well known alkali-chlorination system.

In accordance with the present invention the relatively dilute, yet highly toxic solution contained in the tank 18 is fed via a pump 20 to a concentrator 22 wherein the concentration of cyanide is increased to a value of about 2000 parts per million or more. The concentrated solution is then supplied to an electrolytic cyanide destruction tank 24 wherein a D.C. electric current is passed through the solution to release nitrogen and carbon dioxide to the atmosphere in the vicinity of the anodes. The cyanide compounds are also electrically decomposed and the metal ions are deposited on the cathodes from which the metal can be recovered.

In order to maintain the concentration of cyanide at a sufficiently high level to permit efficient operation of the electrolytic decomposition system, the solution in the tank 24 is continuously or at least periodically fed to the retention tank 18 from which it is recirculated through the concentrator 22 to the electrolytic tank 24. In this manner, the unit 24 is always operated at maximum efficiency and no further cyanide destruction is required.

Considered in greater detail, when used with a metal plating line, the solution in the tank 18 will ordinarily contain sodium cyanide and in some cases one or more metal cyanides such, for example, as copper cyanide. It will be understood by those skilled in the art that other cyanide containing rinses can be combined in the tank 18 if desired. However, recovery of the plating metal then becomes more difficult. The condenser 22 is preferably an evaporator including a tank 26 having a heat exchanger 28 mounted near the bottom thereof. If desired, the heat exchanger 28 may be mounted outside of the tank 26. During normal operation of the system, steam is fed to the exchanger 28 via line 29 wherein it condenses and heats the solution passing therethrough. The condensate from the exchanger is supplied via line 33 to the third rinse tank 16 to provide fresh rinse water for the rinse tanks.

One or more exhaust hoods 30 and 32 are sealably mounted over openings in the top of the tank 26 and a blower 34 draws the gas from the tank 22 through suitable vapor separation and entrainment devices 35 mounted in the hoods 30 and 32 to separate any entrained liquid and vapor passing therethrough.

As shown, the cyanide bearing solution which has been heated to a temperature of about 140° F. flows from the heat exchanger 28 through a valve 36 to spray headers 37 located in the hood sections 30 and 32. As the air passes upwardly across the downwardly traveling heated droplets of the cyanide bearing solution, substantial evaporation occurs. The remaining liquid having a cyanide concentration exceeding about 2000 p.p.m. falls into the tank 26 and flows by gravity via an outlet line 38 to a collection trough 39 mounted above the electrolytic tank 24. The evaporator 22 is operated to provide a continuous liquid flow through the line 38 with the concentration of cyanide salts and cyanide ions in the outlet solution being at about 2000 p.p.m. or more. This concentrated solution then flows into the tank 24.

Reference to FIG. 2 will show the advantage of operating at a cyanide concentration above 2000 p.p.m. in the electrolytic tank 24. While the actual time required to reduce the cyanide concentration any given amount will vary with the size and number of electrodes, electrode spacing and current value, it has been found that the curve is linear from about 2000 p.p.m. and then flattens out. By using the present invention, the electrolytic decomposition tank is always operated in the most efficient, linear region of the curve thus minimizing the electric power required to destroy any given amount of cyanide.

In order to maintain the concentration of cyanide above about 2000 p.p.m. in the tank 24, an outlet line 41 from the tank 42 drains into a sump 42 from which it is returned to the retention tank 18 by a pump 43. Accordingly, the cyanide bearing solution is recirculated from the electrolytic destruction tank back through the evaporator unit 22 to control the cyanide concentration within the tank 24 so that optimum efficiency is maintained.

As shown in FIG. 1, there is a substantially continuous flow of cyanide bearing solution through the tank 24. In some cases, however, it is more economical to provide means for sensing the concentration of cyanide in the tank and for draining and recirculating a portion of the solution from the tank 24 only when the concentration falls below the level at which the tank 24 operates efficiently. In such a system the inlet to the pump is connected directly to the tank 24 as shown in FIG. 3 and the pump is controlled by a sensing device 45 located in the tank 24.

Another important advantage of the present invention is that although the system is substantially continuous in operation, there is no continuous discharge of liquid. It will be understood, however, that the concentration of salts, such as potassium hydroxide and sodium hydroxide increases as a result of evaporation in the evaporator. Periodically, as for example on weekends, when the plating line is shut down, a coolant instead of steam is passed through the heat exchanger to cool and thus supersaturate the solution to crystallize these and other salts contained in the solution thereby facilitating removal and recovery thereof. During such operation, the valve 36 is closed and a valve 46 located in a line 47 is opened to return the supersaturated solution to the tank 18 from which the crystallized salts may be removed. If desired, deionized water may be used in the rinse tanks thereby reducing the presence of undesirable salts and providing a consequent reduction in scaling.

While the present invention has been described in connection with particular embodiments thereof, it will be understood that many changes and modifications of this invention may be made by those skilled in the art without departing from the true spirit and the scope thereof. Accordingly, the appended claims are intended to cover all such changes and modifications as fall within the true spirit and scope of the present invention.

What is claimed is:

1. A method of reducing the concentration of cyanide in a cyanide bearing solution, comprising the steps of
   treating said solution to increase the concentration of cyanide,
   passing an electric current through said treated solution to destroy said cyanide, and
   re-treating the solution after passing said electric current therethrough to maintain the concentration of cyanide in the solution through which said current is passed to a value exceeding about 2000 parts per million.

2. The method set forth in claim 1 wherein
   said treating step is carried out by passing said solution through an evaporator to evaporate water therefrom.

3. The method set forth in claim 1 wherein
   said cyanide bearing solution is taken from a rinse tank in a metal plating system,
   said evaporator includes a heat exchanger to which steam is supplied and cools to form water condensate, and
   feeding said water condensate to said rinse tank.

References Cited
UNITED STATES PATENTS

| | | | |
|---|---|---|---|
| 2,520,703 | 8/1950 | Wagner | 204—149 X |
| 2,619,453 | 11/1952 | Andersen | 204—149 X |
| 2,737,298 | 3/1956 | Hendel | 204—149 |
| 2,773,025 | 12/1956 | Ricks et al. | 204—149 |

JOHN H. MACK, Primary Examiner

A. C. PRESCOTT, Assistant Examiner

U.S. Cl. X.R.

204—130, 131, 72